United States Patent
Kuehner

(10) Patent No.: US 11,628,866 B2
(45) Date of Patent: Apr. 18, 2023

(54) SYSTEMS, METHODS, AND VEHICLES PROVIDING ADAPTIVE WINDOW TRANSPARENCY FOR VEHICLE MODE SWITCHING

(71) Applicant: Toyota Research Institute, Inc., Los Altos, CA (US)

(72) Inventor: Manuel Ludwig Kuehner, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 222 days.

(21) Appl. No.: 17/112,254

(22) Filed: Dec. 4, 2020

(65) Prior Publication Data
US 2022/0176991 A1    Jun. 9, 2022

(51) Int. Cl.
| | |
|---|---|
| *B60W 60/00* | (2020.01) |
| *B60J 3/04* | (2006.01) |
| *B60W 50/16* | (2020.01) |
| *B60W 10/30* | (2006.01) |
| *G08B 6/00* | (2006.01) |
| *G08B 3/10* | (2006.01) |
| *G08B 5/22* | (2006.01) |
| *G01C 21/34* | (2006.01) |

(52) U.S. Cl.
CPC .............. *B60W 60/005* (2020.02); *B60J 3/04* (2013.01); *B60W 10/30* (2013.01); *B60W 50/16* (2013.01); *B60W 60/001* (2020.02); *G01C 21/3453* (2013.01); *B60W 2555/20* (2020.02); *B60W 2556/45* (2020.02); *G08B 3/10* (2013.01); *G08B 5/22* (2013.01); *G08B 6/00* (2013.01)

(58) Field of Classification Search
CPC .. B60W 60/005; B60W 60/001; B60W 10/30; B60W 50/16; B60W 2556/45; B60W 2555/20; B60J 3/04; G08B 3/10; G08B 5/22; G08B 6/00; G01C 21/3453
See application file for complete search history.

(56) References Cited

U.S. PATENT DOCUMENTS

| | | | |
|---|---|---|---|
| 4,346,930 | A | 8/1982 | Northey |
| 6,581,946 | B2 | 6/2003 | Lund et al. |
| 6,688,621 | B2 | 2/2004 | Benirschke |
| 10,843,535 | B1 * | 11/2020 | Mazuir ............... G02F 1/13725 |

(Continued)

FOREIGN PATENT DOCUMENTS

| | | | | |
|---|---|---|---|---|
| DE | 19747171 A1 | 4/1999 | | |
| WO | WO-2016044187 A1 * | 3/2016 | ............... | E06B 9/24 |

OTHER PUBLICATIONS

Machine Translation of WO 2016044187 A1, 2016 (Year: 2016).*

*Primary Examiner* — Peter D Nolan
*Assistant Examiner* — Kenneth M Dunne
(74) *Attorney, Agent, or Firm* — Dinsmore & Shohl LLP

(57) ABSTRACT

In one embodiment, a method of controlling adaptive window transparency includes calculating a buffer period having a start time and an end time. The method also includes adjusting transparency on a set of windows based on the start time of the buffer period and transferring control of the vehicle to the vehicle or driver based on the end time. In response to detecting an emergency, the method further includes removing all tinting on the set of windows. In another embodiment, a method of controlling adaptive window transparency includes calculating a buffer period based on a navigation route.

19 Claims, 5 Drawing Sheets

(56) References Cited

U.S. PATENT DOCUMENTS

| | | | |
|---|---|---|---|
| 2012/0169024 A1 | 7/2012 | Verhee et al. | |
| 2015/0070745 A1* | 3/2015 | Pradhan | E06B 9/24 |
| | | | 359/275 |
| 2017/0334455 A1* | 11/2017 | Asakura | B60W 10/10 |
| 2018/0088574 A1* | 3/2018 | Latotzki | B60W 60/0053 |
| 2018/0162203 A1* | 6/2018 | Boehm | B60Q 9/00 |
| 2019/0054928 A1* | 2/2019 | Hatano | B60W 30/18109 |
| 2019/0100083 A1* | 4/2019 | Ghannam | G05D 23/1931 |
| 2019/0346701 A1* | 11/2019 | Lam | G06V 20/597 |
| 2020/0130481 A1* | 4/2020 | Salter | G02F 1/13318 |
| 2020/0269663 A1* | 8/2020 | Urano | G05D 1/0088 |
| 2020/0319636 A1* | 10/2020 | Urano | B60W 50/0097 |
| 2020/0339160 A1* | 10/2020 | Rosenbaum | B60W 40/09 |
| 2021/0061299 A1* | 3/2021 | Wang | B60W 60/0053 |
| 2021/0061312 A1* | 3/2021 | Wang | B60W 50/14 |
| 2021/0316724 A1* | 10/2021 | Kojo | B60W 30/12 |
| 2022/0135073 A1* | 5/2022 | Ferguson | B60J 1/02 |
| | | | 701/25 |

* cited by examiner

SYSTEMS, METHODS, AND VEHICLES PROVIDING ADAPTIVE WINDOW TRANSPARENCY FOR VEHICLE MODE SWITCHING

TECHNICAL FIELD

The present specification relates to systems, methods, and vehicles for controlling a vehicle's window transparency, and more particularly to systems, methods, and vehicles for controlling a vehicle's windows transparency with respect to its autonomous operation.

BACKGROUND

Driving a manually operated vehicle requires a high degree of situational awareness from the driver. The driver should be aware of his or her surroundings to properly maneuver the vehicle while avoiding a collision. In recent times, vehicles have added cameras to enhance a driver's situational awareness, but the prototypical device to enhance situational awareness on a vehicle has been its windows. The windows of a vehicle serve, in part, to shield the driver from the elements while still allowing the driver to have the situational awareness sufficient to operate the vehicle.

Even with the appropriate level of situational awareness, human drivers are still prone to a non-trivial degree of error. Automating the task of driving is thought to greatly reduce the potential for error. Moreover, it frees the driver to do other tasks while on a potentially hours-long drive. However, if drivers no longer need to operate a vehicle, then windows are not necessary on the vehicle because situational awareness of the driving environment is no longer relevant. The driver could be even more freed from the vehicle when he or she does not have to concern himself with the vehicle's surroundings. Nevertheless, some active driving will still be necessary until autonomous driving algorithms are sufficiently trained, and thus the windows should remain. Therefore, windows that can adapt its transparency with respect to the vehicle's driving mode, and thus the level of driver situational awareness required, may be desired.

SUMMARY

In general, the following embodiments include a vehicle having a set of windows capable of applying a tint to substantially remove a driver from a driving environment and capable of removing the tint for the driver to regain situational awareness of the driving environment. In embodiments, the transitions between different degrees of tinting are gradual and based on a transition rate that relates to a buffer time. The buffer time represents the time until the driver has to regain control of the vehicle.

In one embodiment, a method of controlling adaptive window transparency includes calculating a buffer period based on the vehicle's location data. The method also includes adjusting tint levels on a set of windows based on the calculated buffer period. In response to detecting an emergency, the method further includes removing all tinting on the set of electrochromic windows.

In another embodiment, a method of controlling adaptive window transparency includes calculating a navigation route. The method adjusts window transparency based on the planned mode changes within a navigation route.

In another embodiment, a method of controlling adaptive window transparency includes providing the driver a notification based on the buffer period.

These and additional features provided by the embodiment of the present disclosure will be more fully understood in view of the following detailed description, in conjunction with the drawings.

BRIEF DESCRIPTION OF THE DRAWINGS

The embodiments set forth in the drawings are illustrative and exemplary in nature and are not intended to limit the disclosure. The following detailed description of the illustrative embodiments can be understood when read in conjunction with the following figures, where like structure is indicated with like reference numerals and in which.

DETAILED DESCRIPTION

The embodiments disclosed herein describe systems, methods, and vehicles for controlling a vehicle's adaptive window transparency with respect to its autonomous operation. A driver should have situational awareness when manually operating a vehicle but does not need the same level of situational awareness once the vehicle begins to operate itself in an autonomous mode. Conversely, once the vehicle is going to stop operating itself in an autonomous mode, the driver should regain situational awareness to appropriately operate the vehicle in a manual mode. The time period in which the driver can phase out or in the driver's situational awareness, whichever case it may be, is referred to herein as a "buffer period."

Windows are the prototypical devices to enhance situational awareness on a vehicle because they protect drivers from the elements while still enabling them to see outside the vehicle, referred to herein as the "driving environment." For purposes of the present disclosure, any material capable of modifying its transparency may be used as a window material. Windows that can control their transparency, for example, include electrochromic windows. Electrochromic windows can control the transparency of the windows by electrically applying various levels of tinting. Without any tinting, electrochromic windows are transparent and operate as ordinary windows. With full tinting, electrochromic windows are opaque and remove the driver from the driving environment. Opaque windows and the autonomous operation of a vehicle combine to fully free the driver from the driving environment and do other tasks.

However, as with vehicle mode switching, sudden changes may be jarring to the driver. Autonomous vehicle modes often provide the driver with a notification that the vehicle is about to switch between manual and autonomous modes, giving the driver an opportunity to maintain control until the vehicle takes over or to regain situational awareness when driving is to be returned to the driver, whichever the case may be. Likewise, changing window tinting should also not be sudden, with the exception of unusual circumstances. Embodiments described herein gradually transition the window tinting based on the buffer period, referred to herein as a "transition rate."

As described in detail herein, embodiments of the present disclosure assist the driver in the phasing out or in of situational awareness when the vehicle is switching its mode of operation. Various embodiments of systems, methods, and vehicles for controlling adaptive window transparency with respect to vehicle mode switching are described in detail below.

Figure 1A:
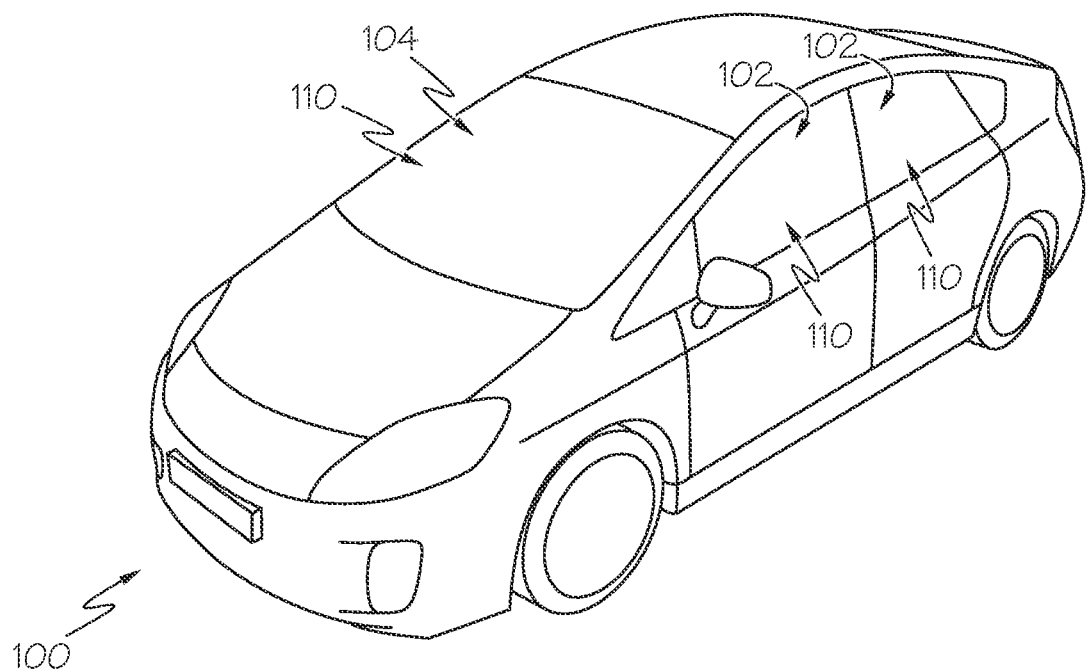
FIG. 1A graphically illustrates an example vehicle wherein the windows are transparent.
Figure 1B:
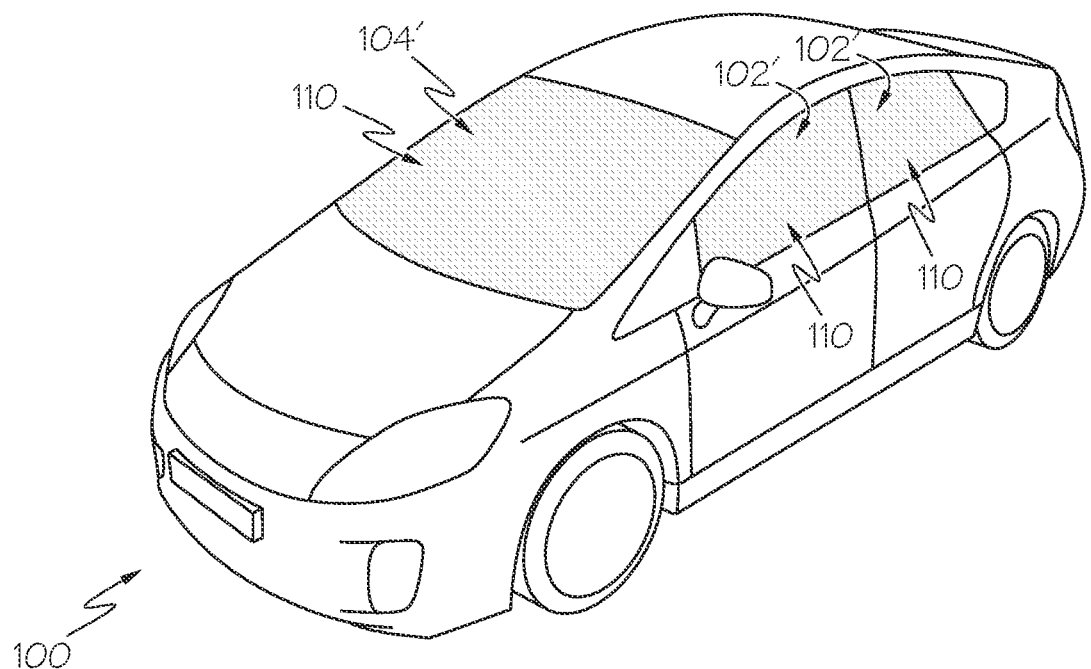
FIG. 1B graphically illustrates an example vehicle wherein the windows are not transparent.

Referring now to FIGS. 1A and 1B, an example vehicle 100 with a set of side windows and windshields (collectively, the "windows" 110) in two extreme levels of window opacity are graphically illustrated. It should be understood that embodiments are not limited to any specific configuration of windshields and side windows. It should also be understood that the windows are not limited to any specific material. It should also be understood that tinting may be changed independent of the driving mode. The example vehicle 100 has a standard configuration of vehicle windows, that is a set of side windows (left and right) and a set of windshields (forward and backward). The windows of example vehicle 100 utilize electrochromic windows to control window transparency. In FIG. 1A, the example windows 102, 104 have no tinting, and thus are completely transparent, thereby enabling the driver to have full situational awareness of the driving environment for manual operation of the vehicle 100. In FIG. 1B, the example electrochromic windows 102',104' have full tinting, and thus are completely opaque, thereby enabling the driver to shift the driver's attention from situational awareness of the driving environment to other tasks, assuming an autonomous driving mode has been enabled.

Figure 2:
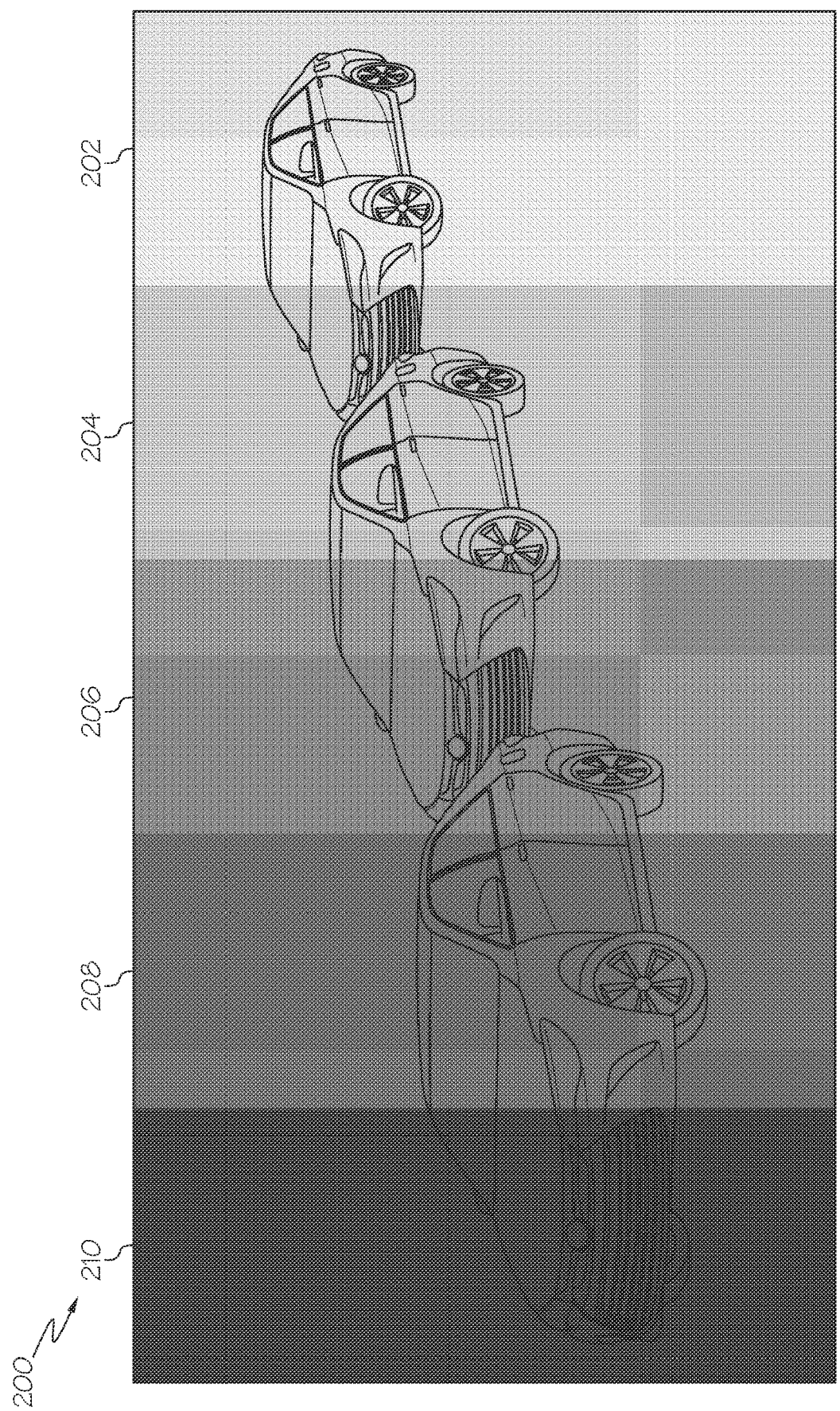
FIG. 2 graphically illustrates an example transition of window transparency.

Referring now to FIG. 2, a vehicle 100 in motion with electrochromic windows 110 is graphically illustrated. Window tint is typically represented as a percentage of visible light levels that can pass through the window. The percentage represents the amount of light that can pass through the windows. Therefore, a low tint percentage would appear much darker than a higher tint percentage. It should be understood that the electrochromic windows 110 may be tinted to any degree between 100% (i.e., transparent) and 0% (i.e., opaque).

The period of the vehicle mode switch from driver-to-vehicle or vehicle-to-driver, as the case may be, is a buffer period that gives the user sufficient time to regain full control of the vehicle 100. The rate at which the tinting transition 200 occurs (i.e., the transition rate) is based upon the buffer period, described in more detail below. For example, if a driver should take full control of the vehicle 100 in three minutes, the buffer period is three minutes, and the windows will become more transparent at a transition rate such that the windows go from opaque to transparent preferably before the start of the buffer period. In some embodiments, the transition rate is based upon whether the vehicle 100 has detected an emergency. For example, if the vehicle 100 becomes involved in a collision, the windows will become transparent at a transition rate that is or is nearly instantaneous to help the passengers safely exit the vehicle.

FIG. 2 depicts an example electrochromic window tinting transition 200 from a starting 65% tint 202 to an ending 5% tint 210 in 15% increments. The tinting transition 200 increments are not limited to 15%. The vehicle 100 determines the starting 202 and ending 210 tints and calculates the rate of the tinting transition 200. In some embodiments, when tinting occurs and the rate at which it occurs may be based on a planned take-over scenario as may be found in a calculated navigation route. The transition rate may be referred to herein as "positive" to indicate that tinting is to be applied to the windows and as "negative" to indicate that tinting is to be removed from the windows. It should be understood that the transition rate need not be linear. For example, the tinting transition 200 may begin in 1% tinting intervals but exponentially increase within the transition period.

Figure 3:
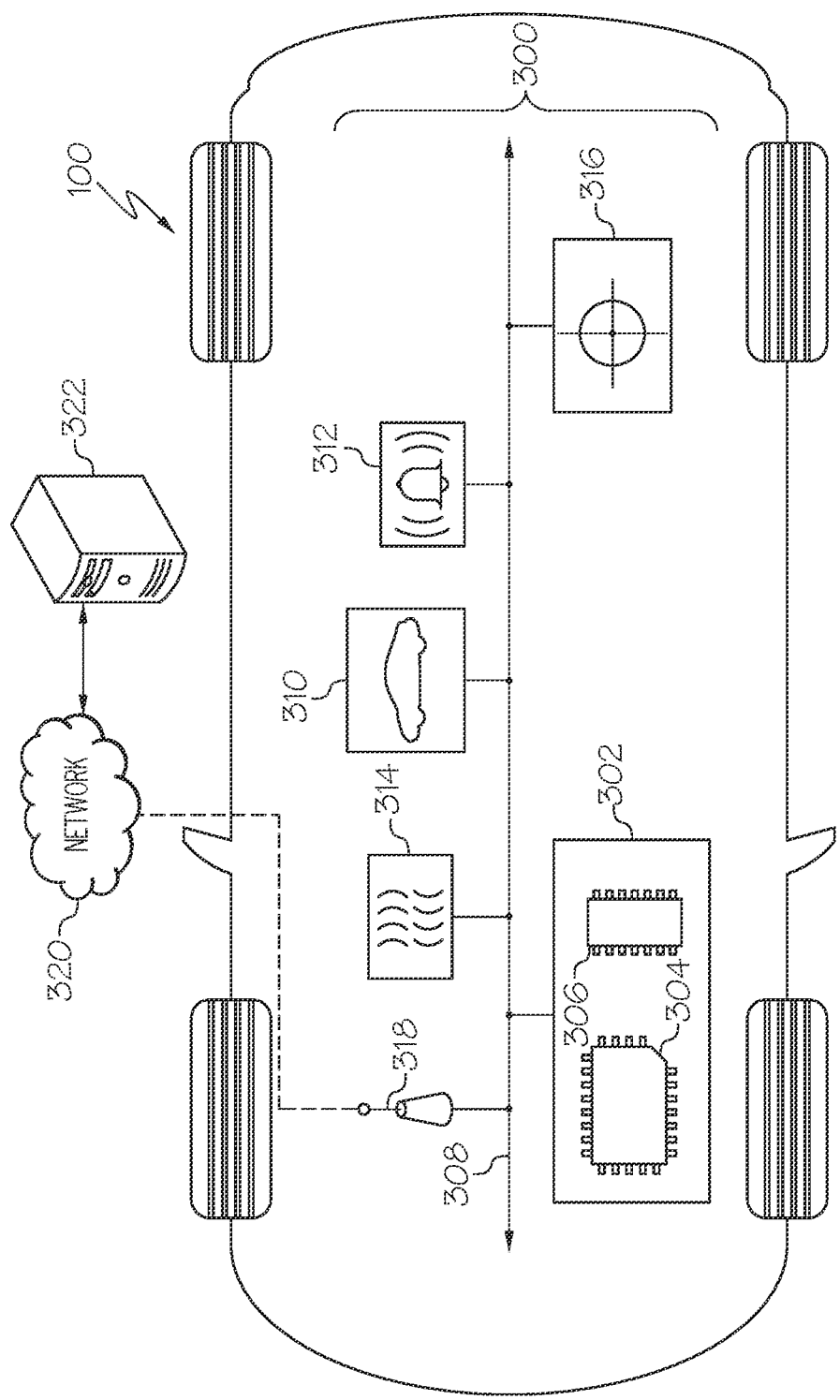
FIG. 3 schematically depicts an example computing system for adaptive window transparency.

Referring now to FIG. 3, a computing system 300 of the vehicle 100 is schematically depicted. It should be understood that the computing system 300 is provided for illustrative purposes only and that other computing systems comprising more, fewer, or different components may be utilized. As used herein, the term "communicatively coupled" means that coupled components are capable of exchanging data signals with one another, such as electrical signals via conductive medium, electromagnetic signals via air, optical signals via optical waveguides, and the like.

The example computing system 300 includes an electronics control module 302, a window tinting module 314, a notification module 312, an autonomous control module 310, a location determination module 316, a wireless communication module 318, and a communication path 308. External components may include a network 320 and a server 322.

Figure 4:
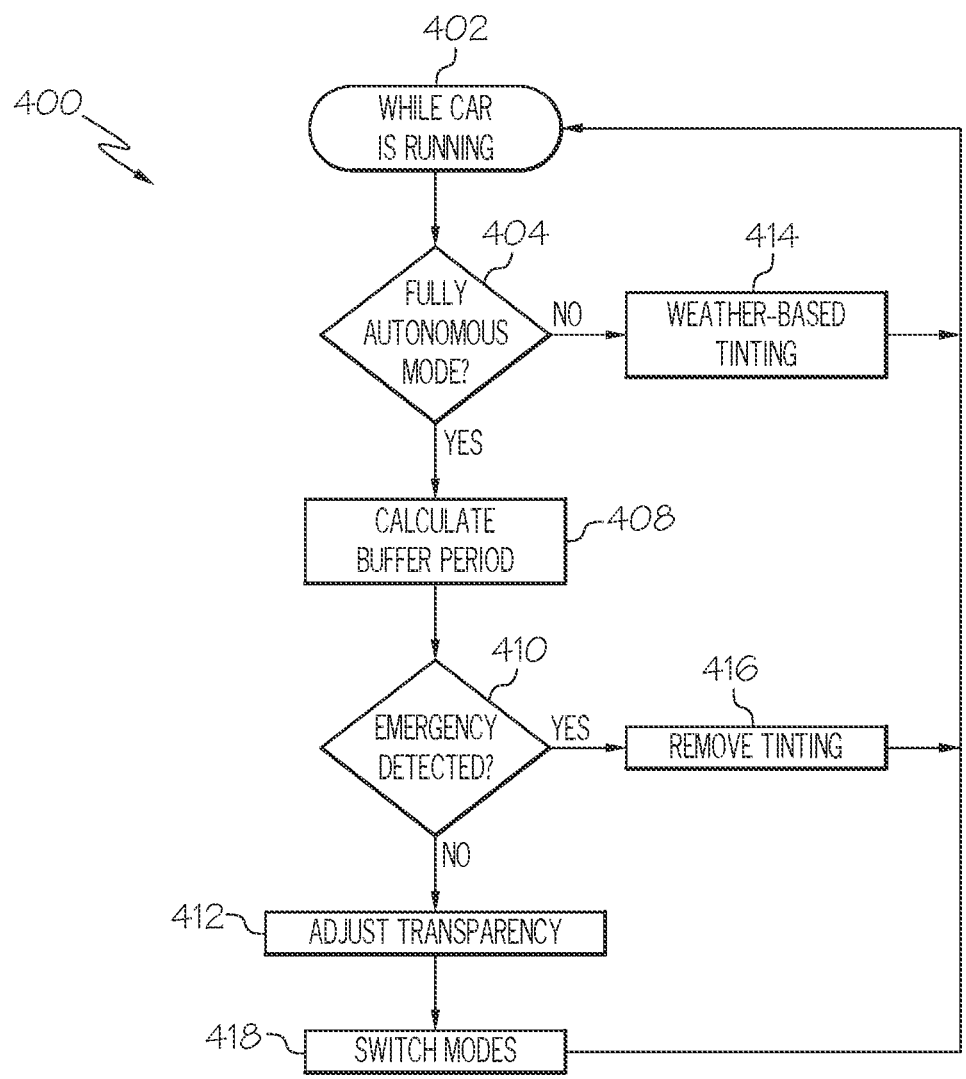
FIG. 4 schematically depicts a flowchart of an example method for adaptive window transparency, according to one or more embodiments shown and described herein.

The electronics control module 302 is configured to calculate, at least, a buffer period, the details of such calculation are explained in FIG. 4. The electronics control module 302 may also calculate a navigation route, among other things. The electronics control module 302 is communicatively coupled to the communication path 308.

A window tinting module 314 is communicatively coupled to the electronics control unit 302 via the communication path 308. The electronics control module 302 may pass the calculated transition rate and buffer period to the window tinting module 314 to adjust tint levels on the electrochromic windows 110.

A notification module 312 is communicatively coupled to the electronics control module 302 via the communication path 308. The electronics control module 302 may pass the calculated buffer period to the notification module 312 to provide notice to the driver that the vehicle mode is soon going to change.

An autonomous control module 310 is communicatively coupled to the electronics control module 302 via the communication path 308. The electronics control module 302 passes the calculated buffer period to the autonomous control module 310 to change the vehicle mode from one state to another (e.g., vehicle-driven to driver-driven) by the end of the buffer period.

A location determination module 316 is communicatively coupled to the electronics control module 302 via the communication path 308. As a non-limiting example, the location determination module 316 may be a GPS unit. The location determination module 316 may pass the geographical location of the vehicle to the electronic control module 302 to help calculate the navigation route and buffer period.

The communication path 308 provides data interconnectivity between various modules disposed within the vehicle 100. The communication path 308 may be formed from any medium that is capable of transmitting a signal, such as conductive wires, conductive traces, optical waveguides, and the like. In some embodiments, the communication path 308 may facilitate the transmission of wireless signals, such as Wi-Fi, Bluetooth®, Near Field Communication (NFC), and the like. Moreover, the communication path 308 may be formed from a combination of mediums capable of transmitting signals. In one embodiment, the communication path 308 comprises a combination of conductive traces, conductive wires, connectors, and buses that cooperate to permit the transmission of electrical data signals to components such as processors, memories, sensors, input devices, output devices, and communication devices. Accordingly, the communication path 308 may comprise a vehicle bus, such as a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The electronics control module 302 has one or more processors 304 and one or more memory modules 306. Each of the one or more processors 304 may be any device capable of executing computer readable and executable instructions. Accordingly, each of the one or more processors 304 may be a controller, an integrated circuit, a microchip, or any other computing device. The one or more processors 304 are coupled to a communication path 308 that provides signal interconnectivity between various modules of the computing system 300. Accordingly, the communication path 308 may communicatively couple any number of processors 304 with one another and allow the modules coupled to the communication path 308 to operate in a distributed computing environment. Specifically, each of the modules may operate as a node that may send and/or receive data.

The electronics control unit 302 includes one or more memory modules 306. The one or more memory modules 306 may comprise RAM, ROM, flash memory, hard drives, or any device capable of storing computer readable and executable instructions such that the computer readable and executable instructions can be accessed by the one or more processors 302. The computer readable and executable instructions may comprise logic or algorithm(s) written in any programming language of any generation (e.g., 1GL, 2GL, 3GL, 4GL, or 5GL) such as, machine language that may be directly executed by the processor, or assembly language, object-oriented language, scripting language, microcode, etc., that may be compiled or assembled into computer readable and executable instructions and stored on the one or more memory modules 306. Alternatively, the computer readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The electronics control module 302 may take autonomous control of the vehicle 100 using the autonomous control module 310. The autonomous control module 310 may operate the vehicle 100 by utilizing one or more vehicle systems, such as a transmission system, a throttle system, a braking system, a steering system, and the like.

The server device 322, which may generally be a storage medium, may contain one or more data repositories for storing data that is received and/or generated, and may be any physical storage medium, including, but not limited to, a hard disk drive (HDD), memory, removable storage, and/or the like. The server device 322 may be a remote storage device, such as a server computing device, or the like. In some embodiments, the server device 322 stores map information. It should be understood that the server device 322 is not provided in some embodiments.

Still referring to FIG. 3, the computing system 300 may comprise a wireless communication module 318 for communicatively coupling the computing system 300 to a remote server device 322. The wireless communication module 318 can be communicatively coupled to the communication path 308 and can be any device capable of transmitting and/or receiving data via a network 320. Accordingly, the wireless communication module 318 can include a communication transceiver for sending and/or receiving wireless communications. For example, the wireless communication module 318 may include an antenna, a modem, Bluetooth®, Wi-Fi card, WiMAX card, mobile communications hardware, NFC hardware, satellite communication hardware, and/or any hardware for communicating with other networks and/or devices. In some embodiments, the wireless communication module 318 is configured to communicate with remote computing devices by vehicle-to-infrastructure (V2I) and/or vehicle-to-vehicle (V2V) communication protocols.

Referring now to FIG. 4, a flowchart of an example method 400 for adaptive window transparency is depicted. It should be understood that embodiments are not limited by the order of the steps in flowchart 400 nor are embodiments limited to the steps included in flowchart 400. While the vehicle is operating 402, the electronics control unit 302 performs the steps described below.

At block 404, the electronics control module 302 determines the vehicle mode (i.e., manual, autonomous, or some other mode). If the autonomous control module 310 is inactive (i.e., the vehicle 100 is manually driven), the process moves to block 414 where the window tinting module 314 may applying tinting based on light detected or on weather data (e.g., weather data obtained remotely from the remote server 322 or locally).

Next, at block 408, the electronics control module 302 calculates a buffer period for the driver to regain situational awareness of the driving environment. As a non-limiting example, the electronics control module 302 may calculate buffer periods based on planned mode changes as determined by a calculated navigation route. The navigation route may be calculated locally on the electronics control module 302 or remotely on a server device 322. The calculation may include determinations of take-over scenarios (e.g., critical junctions, uncertain roadway conditions, and or other scenarios where the autonomous driving system is incapable of performing) on the navigation route that may require the vehicle to be driven by the driver, necessitating a mode change to manually driving when nearing these scenarios and a mode change to autonomous driving after the scenario has passed. For instance, a navigation route may be calculated that determines the vehicle may drive autonomously with the exception of a take-over scenario that the driver must handle by switching the vehicle mode to manually driven. The electronics control module 302 may calculate an appropriate time in advance of the junction for the user to regain control of the vehicle (i.e., the buffer period). The electronics control module 302 may further calculate a transition rate for the window transparency such that the transition is not jarring to the driver and the vehicle mode switch may be seamless. The tinting transition preferably concludes before the buffer period concludes and the buffer period preferably concludes before the junction such that by the time the vehicle 100 arrives at the junction, the driver has regained situational awareness of the driving environment and is in control of the vehicle. The electronics control module 302 may make similar calculations to determine a buffer period for the vehicle to switch to an autonomous mode after the vehicle has passed the junction and may resume driving autonomously and remove the driver from the driving environment by making the windows opaque.

The vehicle 100 may also constantly monitor the driving environment for an emergency at block 410. Non-limiting examples of emergencies include collisions, vehicle component failures, unanticipated environmental conditions, and the like. If the answer is "yes" at block 410, the process moves to block 416 where any calculated transition rate is overridden to be a transition rate that is fast and negative so that any tinting is quickly removed at block 412.

If the answer is "no" at block 410, the process moves directly to block 412 with the buffer period and corresponding transition rate calculated at block 408, where the window tinting module 314 applies or removes the tinting based on the transition rate. For example, if the transition rate is moderate and negative, the window tinting module 314 may remove tinting at a rate of half the buffer period. It should be understood that the transition rate need not be linear. For example, the transition may begin in 1% tinting intervals but exponentially increase within the transition.

Finally, at block 418 the vehicle switches modes. By this point, the buffer period should be at an end, and the driver should be preparing to regain or remove situational awareness so that the vehicle may return or take control, respectively. To regain situational awareness, window transparency should be such that the driver can clearly evaluate the driving environment before vehicle control has been returned to the driver. To remove situational awareness, window transparency should be such that the drive can no longer see the driving environment after vehicle control has been passed to the vehicle.

Figure 5A:
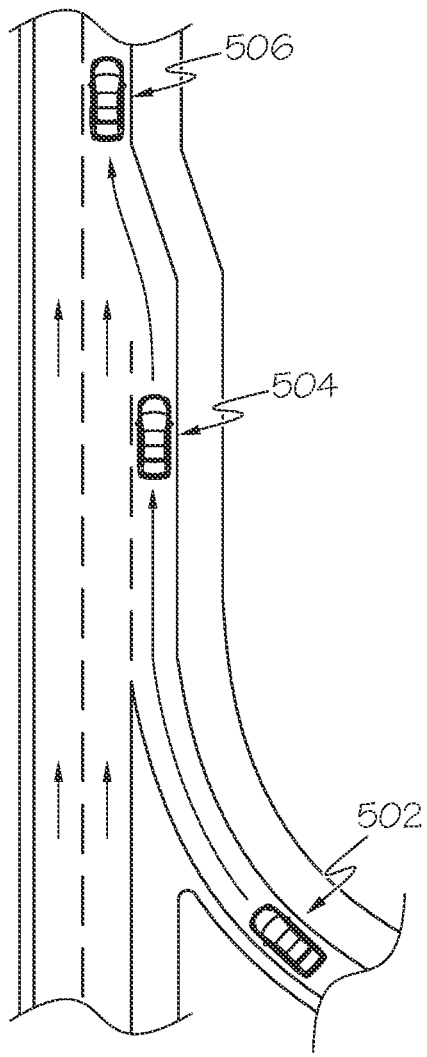
FIG. 5A graphically illustrates an example embodiment of an example method on highway entry.

Referring now to FIG. 5, an example application of an embodiment as applied particularly to highways is shown. FIG. 5A depicts a vehicle 100 entering a highway. If the vehicle mode is switching to vehicle-driven (i.e., autonomous), it may be preferable for the tinting transition 200 to occur after the buffer period has completed so as not to impair the driver's situational awareness before control has been fully handed off to the vehicle. For example, while the vehicle 100 is entering the highway 502, the driver may need full control of the vehicle and full situational awareness to merge the vehicle 100 into traffic. As the vehicle 100 accelerates to highway speeds, the vehicle may calculate a buffer period and a corresponding transition rate. Once the vehicle 100 approaches a cruising phase 506 where it intends on maintaining highway speeds and is nearing the end of the buffer period, the vehicle may begin to apply the tint as control of the vehicle passes from the driver to the vehicle.

Figure 5B:
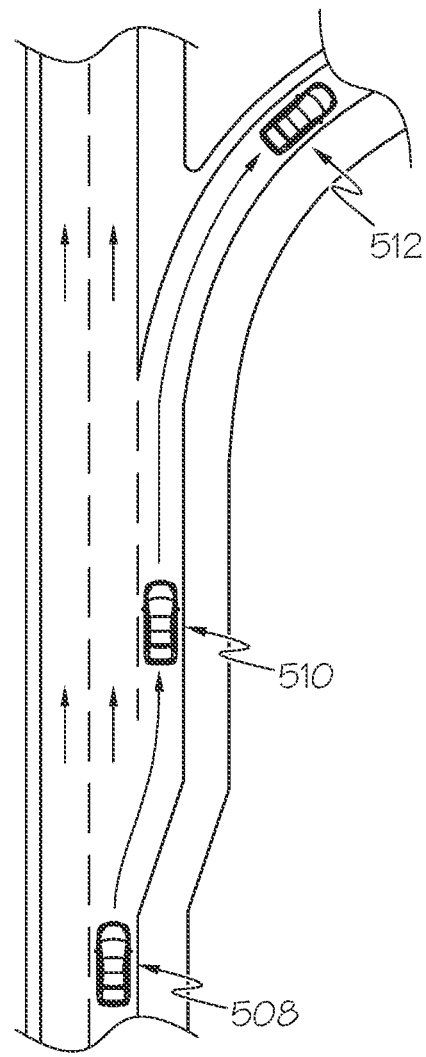
FIG. 5B graphically illustrates an example embodiment of an example method on highway exit.

Similarly, FIG. 5B depicts a vehicle 100 exiting a highway. If the vehicle mode is switching to driver-driven, it may be preferable for the tinting transition 200 to occur before the buffer period has completed so that the driver may regain situational awareness before control has been handed back to him. For example, while the vehicle 100 is approaching an exit, the vehicle may be in a cruising phase 508 and the vehicle 100 may calculate a buffer period and a corresponding transition rate. Once the vehicle is preparing to exit, the vehicle enters a deceleration phase 510 and may begin to remove the tint before the buffer period has completed and control of the vehicle has passed from the vehicle to the driver. Once the vehicle is exiting 512, the window tinting transition should be complete and the driver should be in control of the vehicle 100.

It should now be understood that embodiments of the present disclosure are directed to systems, methods, and vehicles for controlling a vehicle's adaptive window transparency with respect to its autonomous operation. Embodiments calculate a buffer period that the driver will have to take over from autonomous driving and gradually transition the transparency of the vehicle's 100 windows 110 accordingly to improve situational awareness.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method to enhance situational awareness of a driver, the method comprising: operating a vehicle having an autonomous mode, a manual mode, and a set of windows;
    calculating, with a processor, a buffer period having a start time and an end time based on switching between the autonomous mode and the manual mode, and a transition rate that is a rate of transparency change to change a transparency of the set of windows from a first transparency state to a second transparency state over the buffer period;
    adjusting the transparency on the set of windows according to the transition rate such that the transparency changes from the first transparency state to the second transparency state at the end time;
    switching modes based on the end time; and
    in response to detecting an emergency, removing all tinting on the windows.

2. The method of claim 1, wherein:
    calculating further comprises a location determination device.

3. The method of claim 2, wherein:
    calculating, with a processor and a location determination device, further comprises a navigation route.

4. The method of claim 3, wherein:
    calculating, with a processor and a location determination device, further comprises a set of take-over scenarios.

5. The method of claim 1, the method further comprising:
    sending a haptic notification to the driver before the end time.

6. The method of claim 1, the method further comprising:
    sending an audio notification to the driver before the end time.

7. The method of claim 1, the method further comprising:
    sending a visual notification to the driver before the end time.

8. The method of claim 1, wherein:
adjusting the transparency on the set of windows is based on a set of weather data.

9. A vehicle capable of enhancing situational awareness of a driver, the vehicle comprising:
a set of windows capable of adjusting transparency;
a computer system affixed to the vehicle having:
a communication path;
a window tinting module communicatively connected to the communication path;
an autonomous control module communicatively connected to the communication path having an autonomous mode and a manual mode;
an electronics control module communicatively connected to the communication path having:
one or more processors communicatively connected to the electronics control module;
one or more memory modules communicatively connected to the electronics control module having a set of machine readable instructions and upon execution by the one or more processors, performing at least the following:
operating the vehicle by the autonomous control module;
calculating, with the processor, a buffer period having a start time and an end time based on switching between the autonomous mode and the manual mode, and a transition rate that is a rate of transparency change to change a transparency of the set of windows from a first transparency state to a second transparency state over the buffer period;
adjusting transparency on the set of windows according to the transition rate such that the transparency changes from the first transparency state to the second transparency state at the end time;
switching modes based on the end time; and
in response to detecting an emergency, removing all tinting on the windows.

10. The vehicle of claim 9, further comprising:
a location determination module communicatively connected to the communication path.

11. The vehicle of claim 10, wherein:
the machine readable instructions further perform calculating, with a processor and
a location determination module, a buffer period based on location data of the vehicle.

12. The vehicle of claim 10, wherein:
the machine readable instruction of calculating, with a processor and a location determination device, further comprises a navigation route.

13. The vehicle of claim 12, wherein:
the machine readable instructions further perform calculating, with a processor and a location determination device, a buffer period based on the navigation route.

14. The vehicle of claim 10, further comprising:
a notification module communicatively connected to the communication path.

15. The vehicle of claim 14, wherein:
the machine readable instructions further perform sending a haptic notification to the driver before the end time.

16. The vehicle of claim 14, wherein:
the machine readable instructions further perform sending an audio notification to the driver before the end time.

17. The vehicle of claim 14, wherein:
the machine readable instructions further perform sending a visual notification to the driver before the end time.

18. The vehicle of claim 9, further comprising:
a wireless communication module communicatively connected to the communication path;
an external network communicatively connected to the wireless communication module; and
an external server communicatively connected to the wireless communication module.

19. The vehicle of claim 9, wherein:
the machine readable instruction of adjusting the transparency on the set of windows is based on a set of weather data.

* * * * *